Aug. 12, 1969
A. M. LARKIN
3,460,857
HYDRAULIC SWING JOINT WITH SEALS HAVING ECCENTRIC SEALING CONTACT
Filed July 5, 1966
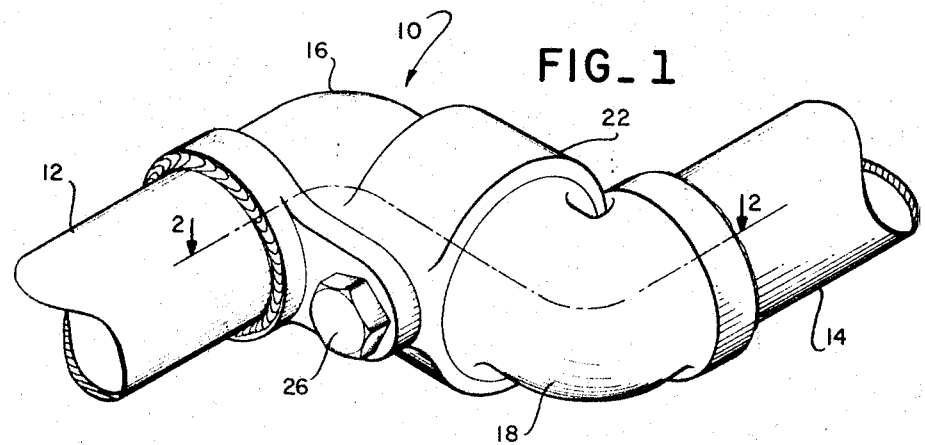
FIG_1
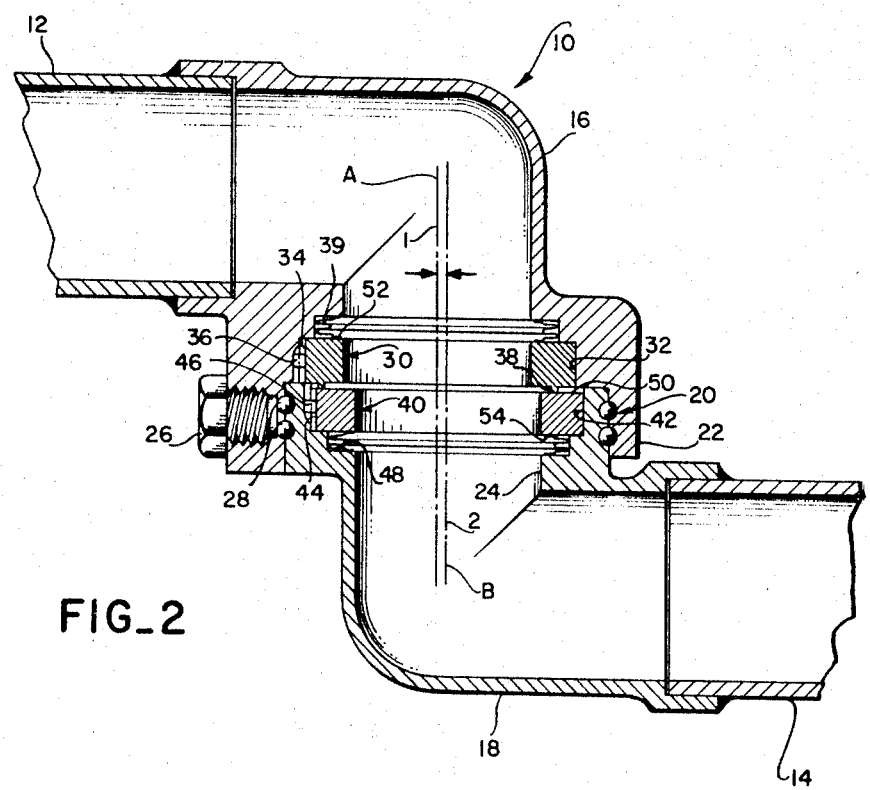
FIG_2
INVENTOR.
ARTEMAS M. LARKIN
BY George C Sullivan
Agent

United States Patent Office 3,460,857
Patented Aug. 12, 1969

3,460,857
HYDRAULIC SWING JOINT WITH SEALS HAVING ECCENTRIC SEALING CONTACT
Artemas M. Larkin, Glendale, Calif., assignor to Lockheed Aircraft Corporation, Burbank, Calif.
Filed July 5, 1966, Ser. No. 562,726
Int. Cl. F16l 17/00, 33/16
U.S. Cl. 285—98                           2 Claims

ABSTRACT OF THE DISCLOSURE

A hydraulic swing joint comprised of a fluid pressure seal located between relatively rotating housings and having two interfacing sealing members arranged eccentrically with respect to the rotational axis of the housings. One sealing member has a narrow annular sealing edge engaging a plane sealing surface of the other sealing member. Accordingly, as the housings are rotated, the annular sealing edge sweeps over an appreciable area of the plane sealing surface to avoid concentrating wear on the plane sealing surface and to minimize entrapment of particles of foreign matter under the sealing edge which could score or damage the sealing members.

---

The invention described and claimed herein resulted from work done under United States Government Contract No. FA–SS–66–7. The United States Government has an irrevocable, non-exclusive license under this application to practice and have practiced the invention claimed herein, including the unlimited right to license others to practice and have practiced the claimed invention for any purpose whatsoever.

BACKGROUND OF THE INVENTION

Field of invention

This invention relates to a swing joint used in conjunction with a hydraulic system capable of operating at high temperatures or extremely high pressures.

When operating a hydraulic system at pressures in excess of 4,000 p.s.i. or in an environment of 450° F., prior art hydraulic components and hydraulic fluids have been found to be inadequate to perform under these conditions. The hydraulic fluid inherently has a tendency to degrade when exposed to contaminants or when exposed to air due to a rapid oxidation of the fluid at these temperatures. Accordingly, it is necessary to prevent exposure of the fluid to air during the operation of the hydraulic system. Further, the high cost of fluids which can function at 450° F. make it somewhat imperative to prevent loss of the fluid during operation. An example of an installation of a hydraulic system in this environment is a proposed supersonic transport which must operate at peak altitudes and speeds which inherently generate a skin friction which will raise the temperature throughout the aircraft to 450° F.

Description of the prior art

Hydraulic systems which are required to operate at 4,000 p.s.i. are unable to function with common flexible hydraulic lines. Pressures of this magnitude are generally restrained by solid hydraulic lines which are welded between hydraulic devices such as pumps, hydraulic cylinders and the like. In many hydraulic applications, it is necessary to provide some mode of flexure either in the hydraulic line or a component which permits flexure or rotation as the case may be. In applications requiring pressures of 4,000 p.s.i., the flexure of the hydraulic lines could lead to rupture and, accordingly, alternative devices are required. In the prior art hydraulic joints, the elastomer or plastic seals used in these devices are inadequate in retaining fluids at extremely high temperatures and pressures. In installations such as in aircraft, hydraulic systems are required to function for extended periods with a minimum possibility or probability of failure since these failures can lead to the loss of the aircraft.

SUMMARY OF THE INVENTION

A hydraulic swing joint comprising a first and second tubular housing rotatable relative to each other around an axis of rotation, a seal beam mounted in the first housing having a continuous lip which contacts an annular seat mounted in the second housing. The seal beam is mounted within the first housing and includes an axis which is eccentrically disposed with relation to the housing axis of rotation, whereby upon rotation of the housings relative to each other, the seal lip sweeps over an appreciable area of the annular seat to avoid concentrating wear on the annular seat surface and to minimize entrapment of foreign matter under the seal lip which could score or damage the sealing members.

Accordingly, in accordance with the present invention, a hydraulic swing joint has been developed which is capable of withstanding an environment of 4,000 p.s.i. while operating at 450° F. This joint has a construction which permits hydraulic lines to be welded to it while having a sustained ability to prevent leakage by its particular construction and configuration. Sealing elements contained within the swing joint are so aligned that sealing faces are self cleaning on the mating surfaces which tend to constantly restore the sealing ability of these elements for an extended period. The construction is so adapted that the sealing element can be removed and replaced during periodic maintenance and repair operations.

Basically, the present invention is most useful in a hydraulic system in which rigid hydraulic lines are used. The swing joint is formed from a pair of tubular housings including a male and a female section which mate with each other and are rotatable relative to each other around an axis of rotation. A sealing ring is disposed within one of the housings and has a lip extending and contacting the other housing. The sealing ring has an axis of rotation which is spaced apart from the housing axis of rotation to thereby enable the sealing ring lip to oscillate back and forth upon the engaged housing when the two housings are rotated relative to each other. The oscillating motion of the sealing ring serves to effect a wiping action and thereby provide a self cleaning motion on the engaged surfaces.

The term "hydraulic" as used in this specification means any fluid, liquid, or gaseous material or any combination of these materials presently used, or as contemplated in the future.

The term "swing joint" as used herein means a hydraulic coupling to which are connected hydraulic lines and these lines enter the coupling either aligned with each other, parallel to each other, at 90° to each other, or at any angle relative to each other.

Other features and advantages of the present invention will become more apparent upon considering the following detailed description and the appended drawings.

BRIEF DESCRIPTION OF THE DRAWINGS

FIGURE 1 is a perspective view of a hydraulic joint constructed in accordance with the present invention and applied to a rigid hydraulic line; and FIGURE 2 is a typical cross-sectional view taken along line 2—2 of the hydraulic swing joint illustrated in FIGURE 1.

Referring to FIGURES 1 and 2, a swing joint 10 constructed according to the present invention is used to link a pair of hydraulic lines 12 and 14 in such a manner as to permit these lines which are rigid to have a flexible joint. Thus the rotation, flexation or oscillation of the hydraulic lines 12 and 14 is absorbed entirely by the joint 10. This hydraulic joint 10 is comprised of a pair of tubular housings 16 and 18 that are coupled together and have an anti-friction bearing 20 disposed therebetween which will permit such rotation. In the present embodiment of the invention illustrated in the drawings, the hydraulic lines are parallel and spaced apart from each other. The hydraulic joint and the housings 16 and 18 can be altered without departing from the spirit of the invention by disposing the hydraulic lines either coaxially with each other, at right angles to each other to form a T, or at any angle with respect to each other dependent upon the particular arrangement of the hydraulic system. It is also possible to incorporate one of the housings from the joint into a hydraulic component such as a pump, hydraulic cylinder, or similar hydraulic unit, thereby permitting the remaining housing to be swiveled, oscillated or rotated to absorb necessary change in position as a necessity arises.

The hydraulic joint 10 includes the hollow, tubular housings 16 and 18 which are rotatable relative to each other around their axis of rotation A. The first housing 16 is considered a female section terminating in an enlarged socket 22 which extends over and permits insertion of a spindle 24 which is formed on the male portion of the second housing 18. A feeder plug 26 is threaded into the female section 22 of the first housing 16 and is used to insert a plurality of conventional ball bearings 28 which are disposed between the two housings 16 and 18 in a conventional manner. Thus, it should be recognized that the two housings, 16 and 18, and the anti-friction bearing 20 all have the same axis of rotation designated A in FIGURE 2.

A means of sealing the two housings 16 and 18 from a leakage of fluid includes a sealing ring 30 which is disposed within a counter bore 32 formed in the female section 22 of the first housing 16. The sealing ring 30 has a sliding fit in the counter bore 32 and includes a slot 34 which cooperates with a key 36 extending from the first housing 16, thereby permitting oscillation of the sealing ring 30 coaxial with the axis of rotation A. The sealing ring 30 has an annular lip 38 which extends from an outer surface and this lip is directed toward the second housing 18.

For purposes of sealing the sealing ring 30 to the first housing 16, a conventional metallic seal 39 is disposed between the sealing ring 30 and the counter bore 32. This conventional seal 39 permits oscillation of the sealing ring without leakage of fluid around the sealing ring 30 and past the anti-friction bearings 20. Hydraulic fluid passing through the joint 10 would tend to expand the seal 39, which has an E shaped cross section, and urge it into closer sealing relation with the housing 10 and the sealing ring 30.

A seal seat 40 is substantially annular in configuration and is disposed in abutting relation with the lip 38 on the sealing ring 30. An important feature of the present invention is the arrangement of the seat 40 within the second housing 18. A counterbore 42, which receives the seat 40, is arranged on an axis of rotation B which is spaced apart from the axis of rotation A of the joint 10 and is, therefore, eccentrically disposed with respect to axis A which is common to the first and second housings 16 and 18, the anti-friction bearing 20, and the sealing ring 30. The seat 40 is thereby permitted to oscillate with the counterbore 42. It is restrained from rotating in this counterbore by a slot 44 cut in the seat in cooperation with a key 46 which extends from the male spindle to the second housing 18. For purposes of sealing the seat 40 to the second housing 18, a conventional metallic seal 48, similar to the seal 39, is disposed within the counterbore 42 and abuts both the second housing 18 and the seat 40. This seal permits flexibility and allows hydraulic fluid entering into the joint 10 to expand this seal into sealing engagement in proportion to the pressure of the hydraulic fluid. The seat 40 has an annular surface 50 which is lapped to a very fine micro finish. Additionally, the lip 38 on the sealing ring 30 is also lapped to the same micro finish and to the seat. It serves to prevent hydraulic fluid passing through the joint 10 from leaking past the sealing ring and its seat. It should be recognized that the sealing ring 30 and its cooperation with the seat 40 acts as a shear seal since the amount of area available on an annular surface 52 on the sealing ring 30 and a similar annular surface 54 on the seat 40 is substantially greater than the surface on the opposite side of the respective sealing ring and seat. This type of construction forces the sealing ring and seat together in proportion to the pressure of the hydraulic fluid passing through the joint and constantly urges the sealing ring and seat into intimate contact with each other.

The operation of the persent invention will now be described with reference to the figures. It is axiomatic that the hydraulic joint 10 is integrally assembled between the hydraulic lines 12 and 14 and a conventional hydraulic system (not shown) is incorporated with this assembly. Upon rotation of the housings 16 and 18 relative to each other, due to a necessity of moving the hydraulic lines 12 and 14 at an angle relative to each other, the seat 40 oscillates in a plane at right angles to the axis of rotation B of this seat. This type of action, that is an oscillation of the seat 40 relative to the sealing ring 30, tends to clean the lapped annular surface 50 on the seat of the lip 38 on the sealing ring to prevent leakage and also to prevent any contaminated material or foreign particles from being wedged between the sealing ring and the seat.

The particular shape of the sealing ring and a sealing seat can be altered. For example, the seat can be incorporated integrally with the housing which supports it and the invention will still perform in the same manner as illustrated. The sealing ring is disposed in a counterbore having an axis which is spaced apart from the axis of rotation of the two housings. This type of arrangement would still permit the sealing ring to oscillate relative to the seat and still be able to obtain the advantages set forth.

I claim:
1. A hydraulic joint comprising:
   first and second interconnecting tubular housings rotatable relative to each other around an axis of rotation;
   an annular seat being mounted in the second housing;
   a seal mounted in the first housing opposite the seat in the second housing, having a continuous lip which abuts the seat, the axis of the seal being eccentrically disposed with relation to the housing axis of rotation, whereby upon rotation of the housings relative to each other, the seal sweeps an area of the annular seal surface;
   a first continuous cavity, formed in the first housing adjacent the seal;
   a second continuous cavity formed in the second housing adjacent the seat; and,
   a first and a second seal having an E shaped cross section, the first and second seals being respectively disposed in the first and second housing cavities, abutting in a fluid tight relationship the seal and the seat and the respective housings, and being flexible such that an increase in pressure of a fluid passing through the joint increases the sealing pressure against the seal, seat, and respective housings.

2. A hydraulic joint as defined in claim 1 wherein the E shaped seals are metallic.

References Cited
UNITED STATES PATENTS

| | | | |
|---|---|---|---|
| 442,809 | 12/1890 | Hunter | 285—281 |
| 2,447,663 | 8/1948 | Payne | 285—375 X |
| 2,698,192 | 12/1954 | Bily | 285—181 X |
| 2,789,843 | 4/1957 | Bily | 285—100 X |
| 3,195,931 | 7/1965 | Braunagel | 285—375 X |
| 3,235,273 | 2/1966 | Bialkowski | 277—96 X |
| 2,601,996 | 7/1952 | Sefren | 277—88 X |
| 2,723,136 | 11/1955 | Deubler | 285—276 X |

CARL W. TOMLIN, Primary Examiner

DAVE W. AROLA, Assistant Examiner

U.S. Cl. X.R.

277—88, 96; 285—181, 276